(12) United States Patent
Eger (10) Patent No.: US 11,358,450 B2
(45) Date of Patent: Jun. 14, 2022

(54) APPARATUS AND METHOD FOR ADJUSTING A SCREEN ARRANGEMENT FOR A VEHICLE ROOF, AND VEHICLE ROOF FOR A MOTOR VEHICLE

(71) Applicant: Webasto SE, Stockdorf (DE)

(72) Inventor: Klaus Eger, Reut (DE)

(73) Assignee: WEBASTO SE, Stockdorf (DE)

( * ) Notice: Subject to any disclaimer, the term of this patent is extended or adjusted under 35 U.S.C. 154(b) by 311 days.

(21) Appl. No.: 16/814,552

(22) Filed: Mar. 10, 2020

(65) Prior Publication Data

US 2020/0290442 A1 Sep. 17, 2020

(30) Foreign Application Priority Data

Mar. 15, 2019 (DE) .......................... 102019106668.9
Jul. 12, 2019 (DE) .......................... 102019118998.5

(51) Int. Cl.
*B60J 7/043* (2006.01)
*B60J 7/057* (2006.01)
(Continued)

(52) U.S. Cl.
CPC ........... *B60J 7/0435* (2013.01); *B60J 7/0573* (2013.01); *B60R 11/0235* (2013.01);
(Continued)

(58) Field of Classification Search
CPC ......... B60R 11/0235; B60R 2011/0028; B60R 2011/0092; B60R 2011/008;
(Continued)

(56) References Cited

U.S. PATENT DOCUMENTS 9,442,688 B2 9/2016 Rawlinson et al.
2008/0169402 A1 7/2008 Sturt
(Continued)

FOREIGN PATENT DOCUMENTS

DE 102008003053 A1 7/2008
DE 102012008581 A1 10/2013
(Continued)

OTHER PUBLICATIONS

Search Report issued against EP Patent Application No. 20160888.2 dated Sep. 23, 2020; English translation not available (7 pages).

*Primary Examiner* — Nathnael Aynalem (74) *Attorney, Agent, or Firm* — Fitch, Even, Tabin & Flannery, LLP (57) ABSTRACT

An apparatus for adjusting a screen arrangement for a vehicle roof may have a main slider and an adjusting slider which can each be coupled to the screen arrangement and are configured for pivoting the screen arrangement out and in and for adjusting a prescribed alignment angle (A) of the screen arrangement. The apparatus may also have a drive coupling element which couples a drive cable of the main slider and a drive cable of the adjusting slider to one another, such that the main slider and the adjusting slider can be displaced, with respect to a common reference point, at least in certain portions, at different movement speeds, and such that with respect to a longitudinal axis (L) of the apparatus a spacing between the main slider and the adjusting slider (Continued)

and therefore an alignment angle (A) of the screen arrangement can be adjusted in a prescribed manner.

11 Claims, 7 Drawing Sheets

(51) Int. Cl.
  *B60R 11/02* (2006.01)
  *B60R 11/00* (2006.01)
(52) U.S. Cl.
  CPC ............... *B60R 2011/0028* (2013.01); *B60R 2011/0045* (2013.01); *B60R 2011/0082* (2013.01); *B60R 2011/0084* (2013.01); *B60R 2011/0087* (2013.01); *B60R 2011/0092* (2013.01)
(58) Field of Classification Search
  CPC ..... B60R 2011/0082; B60R 2011/0084; B60R 2011/0085; B60R 2011/0087; B60J 7/0435; B60J 7/043; B60J 7/0573; B60K 2370/67; B60K 2370/771; B60K 2370/816; B60K 2370/80; B60K 2370/822
  USPC ........................................................ 348/148
  See application file for complete search history.

(56) References Cited

U.S. PATENT DOCUMENTS

| | | |
|---|---|---|
| 2011/0133028 A1 | 6/2011 | Riedel et al. |
| 2015/0138448 A1 | 5/2015 | Rawlinson et al. |
| 2017/0297419 A1* | 10/2017 | Ten-Jet-Foei .......... B60J 1/2061 |
| 2018/0079369 A1 | 3/2018 | Catlin et al. |
| 2019/0275955 A1 | 9/2019 | Haumayr et al. |
| 2021/0162931 A1* | 6/2021 | Bruegl ............... F16M 11/2028 |

FOREIGN PATENT DOCUMENTS

| | | |
|---|---|---|
| DE | 102015117934 A1 | 4/2017 |
| DE | 102015120809 A1 | 6/2017 |
| DE | 102016225745 A1 | 6/2018 |
| DE | 102018129479 | 5/2020 |
| DE | 102018129479 A1 | 5/2020 |
| EP | 2873563 A1 | 5/2015 |
| JP | H11-342798 A | 12/1999 |
| JP | 2004-149057 A | 5/2004 |
| JP | 2004-182049 A | 7/2004 |
| JP | 2007-314057 A | 12/2007 |
| JP | 2009-166582 A | 7/2009 |
| JP | 2015-134573 A | 7/2015 |
| JP | 2017-114287 A | 6/2017 |
| WO | WO-2011003617 A1 * | 1/2011 .............. B60J 7/024 |

* cited by examiner

FIG 11

APPARATUS AND METHOD FOR ADJUSTING A SCREEN ARRANGEMENT FOR A VEHICLE ROOF, AND VEHICLE ROOF FOR A MOTOR VEHICLE

CROSS-REFERENCE TO RELATED APPLICATIONS

This application claims priority from German Application 102019106668.9, filed Mar. 15, 2019; and German Application 102019118998.5, filed Jul. 12, 2019, which are hereby incorporated herein by reference in their entirety for all purposes.

FIELD

The invention relates to an apparatus and a method for adjusting a screen arrangement for a vehicle roof. The invention also relates to a vehicle roof for a motor vehicle having such an apparatus.

BACKGROUND

Some motor vehicles have a screen arrangement which can, if desired, provide an entertainment programme and contributes to an increased comfort of the motor vehicle. Such a screen arrangement may be provided with a kinematic design, which makes it possible to fold the screen arrangement in and out, as desired. In this case, it is a challenge to facilitate a space-saving and cost-effective arrangement of such entertainment electronics.

SUMMARY

The invention is based on the object of providing an apparatus and a method for adjusting a screen arrangement for a vehicle roof, which respectively facilitate a reliable and secure configuration of a desired adjustment of the screen arrangement and which may contribute to a cost-effective and comfortable motor vehicle.

The object is achieved by way of the features of the independent claims. Advantageous embodiments are specified in the respective dependent claims.

According to the invention an apparatus for adjusting a screen arrangement for a vehicle roof comprises a main slider and an adjusting slider. The main slider is configured to be coupled to the screen arrangement and is further configured for pivoting the screen arrangement out and in and for displacing the latter. The adjusting slider is configured to be coupled to the screen arrangement and is further configured for adjusting a prescribed alignment angle of the screen arrangement. In a guide rail, the main slider is mounted so as to be drivable by means of a first drive cable and the adjusting slider is mounted so as to be drivable by means of a second drive cable. The apparatus also has a drive coupling element which couples the drive cable of the main slider and the drive cable of the adjusting slider to one another, such that the main slider and the adjusting slider can be displaced, with respect to a common reference point, at least in certain portions, at different movement speeds. The main slider, the adjusting slider and the drive coupling element are also configured such that with respect to a longitudinal axis of the apparatus a spacing between the main slider and the adjusting slider and therefore an alignment angle of the screen arrangement can be adjusted in a prescribed manner by means of the adjusting slider, independently of a position of the screen arrangement set by means of the main slider.

By means of the described apparatus, a comfortable and reliable adjustment of a desired position and alignment of a screen arrangement is possible, which is also realizable in a cost-effective manner and can be integrated into the design of a vehicle roof for a motor vehicle in a space-saving manner.

According to a preferred embodiment of the apparatus, the drive coupling element is configured as a gear which is coupled to the adjusting slider and which engages with the drive cable of the main slider and with the drive cable of the adjusting slider. The gear makes a particularly simple and cost-effective coupling of the drives possible. As an alternative, the gear can be arranged on the main slider and can form a coupling between the adjusting slider and the main slider by means of the drive cables. As an alternative or in addition, a coupling of the drives can be configured by way of lever mechanisms and/or a gearing, in order to actuate the main slider and the adjusting slider in a targeted manner and to align the screen arrangement as desired.

The gear is for example designed, with regard to the toothing thereof, such that a prescribed movement speed of the adjusting slider is set, said speed being, at least in certain portions, half as great as a drive speed of the drive cables. The drive cables are for example embodied as spiral-shaped cables into which the toothing of the gear can engage.

The drive cables can also be referred to as pitch cables. The main slider and the adjusting slider are for example linear sliders which, during an alignment of the screen arrangement, are guided in a provided channel of the guide rail. The gear, as drive coupling element, makes a specifically set reduction in speed of a linear slider possible by coupling the pitch cable drives.

According to a further preferred embodiment, the apparatus comprises a lever arrangement which couples the main slider and the adjusting slider to one another in a releasable manner. The lever arrangement has two pivot levers and a coupling lever which are each coupled to one another so as to be able to pivot relative to each other. One of the pivot levers is coupled to the adjusting slider. The coupling lever is coupled to the main slider in a releasable manner, such that the coupling lever, in a first folded-in state of the screen arrangement, is coupled to the main slider and, in a second folded-out state of the screen arrangement, is decoupled from the main slider. The coupling lever is for example of U-shaped or pincer-shaped configuration and engages around a coupling pin on the main slider in the first folded-in state of the screen arrangement.

The main slider and the adjusting slider are also coupled to one another by means of the screen arrangement in an installed state of the apparatus. The described releasable coupling, which is configured by means of the lever arrangement, realizes a kind of rotary latch on the screen arrangement, having over-centre kinematics which release the coupling once a specific alignment has been reached.

According to a preferred embodiment, the apparatus comprises a first and a second drive unit. The first drive unit is coupled to the first drive cable or the drive cable of the main slider and the second drive unit is coupled to the second drive cable or the drive cable of the adjusting slider. The first and/or the second drive unit in particular have/has an electric motor.

By means of the described apparatus, an electrically actuatable mechanism for pivoting and displacing a screen arrangement can be realized, which makes a comfortable lowering, alignment and adjustment of a display in a vehicle interior possible. The vehicle roof for example has a displaceable cover. The vehicle roof is for example a roof for a convertible car.

By means of the main slider and the first drive unit which can be coupled thereto, the screen arrangement can be pivoted in and out and displaced in a controlled and reliable manner, in order to configure a desired pivoted position or position of travel of the screen arrangement. By means of the adjusting slider and the second drive unit which can be coupled thereto, an angular alignment can be changed and the screen arrangement can be aligned for more comfortable viewing, independently of the pivoted position or position of travel of the screen arrangement.

The described apparatus has a particularly manageable design with a small number of components and can be realized in a cost-effective and space-saving manner. An installation space requirement in a vehicle interior can thus be kept low. The apparatus can in particular be integrated into a vehicle roof or be arranged on such a roof and can nevertheless allow for a comfortable range of head movement in the vehicle interior. In this way, it is possible to contribute to a high-quality entertainment option in a motor vehicle.

The described apparatus makes it possible to cut down on complex lever mechanisms and to reduce a play of a link motion of a lever for folding out the screen arrangement. By means of the apparatus, unfavourable lever ratios can be avoided or at least reduced.

Particularly, when the drive coupling element is configured in the form of a gear drive, the described apparatus makes possible a slower movement of the screen with identical opening movement of the vehicle roof. An inclination of the screen is determined by the spacing between the main slider and the adjusting slider. The main slider is preferably driven directly by a pitch cable or the first drive cable. The gear is mounted on the adjusting slider, said gear engaging with the pitch cable for the purposes of driving the main slider and with a further pitch cable for the purposes of driving the gear. The adjusting slider with the gear is moved, for example, at half the speed of the pitch cable. As a result, the inclination of the screen arrangement is changed at a lower speed and the adjustment can be effected more precisely.

A movement play that is present in the pitch or drive cables has substantially less of an effect on the spacing of the sliders with respect to each other, and thus on the inclination of the screen arrangement, than when both sliders are driven directly by the pitch cables. In this way, useful lever ratios can be realized.

A vehicle roof according to the invention comprises two guide rails which are arranged, in relation to a longitudinal axis of the vehicle roof, on opposite sides of the vehicle roof. The vehicle roof also comprises a refinement of the above-described apparatus for adjusting a screen arrangement, said apparatus being coupled to the vehicle roof by means of the guide rails. The apparatus can in particular utilize existing spaces within a respective guide rail, said spaces also being configured, for example, for operating a shading apparatus. In particular, the two sliders are arranged within a common guide rail.

With regard to a vehicle roof, the apparatus can in particular comprise double the number of the described components, which are configured and arranged in a substantially mirror-symmetrical manner with respect to a central or middle longitudinal axis of the vehicle roof. The vehicle roof with the described apparatus therefore contributes to an increased comfort of a motor vehicle and can be produced in a more space-saving and more cost-effective manner in comparison to conventional tilting devices for a display. By virtue of the fact that the vehicle roof comprises a refinement of the above-described apparatus, all of the above-described features and properties of the apparatus are also disclosed for the vehicle roof.

A method according to the invention for adjusting a screen arrangement for a vehicle roof comprises driving a main slider, which is coupled to the screen arrangement in a pivotable manner, by means of displacement of a first drive cable, and therefore pivoting the screen arrangement and configuring a folded-out state of the screen arrangement. The method also comprises driving an adjusting slider, which is coupled to the screen arrangement in a pivotable manner, by means of displacement of a second drive cable, wherein the drive cable of the main slider and the drive cable of the adjusting slider are coupled to one another by means of a drive coupling element, such that the main slider and the adjusting slider can be displaced, with respect to a common reference point, at least in certain portions, at different movement speeds. In this way, adjustment of a prescribed spacing between the main slider and the adjusting slider in relation to a longitudinal axis of the vehicle roof and therefore adjustment of a prescribed alignment angle of the screen arrangement is effected, independently of the configured folded-out state of the screen arrangement.

By means of the described method, a reliable and secure configuration of a desired adjustment of the screen arrangement is possible and it can also contribute to a cost-effective and comfortable motor vehicle. The method can in particular be performed by means of a refinement of the above-described apparatus, such that, if applicable, all of the described features and properties of the apparatus are also disclosed for the method, and vice versa.

According to an embodiment of the method, the driving of the main slider and the driving of the adjusting slider comprises actuating a first drive unit which is coupled to the drive cable of the main slider, and therefore moving at least one of the main slider and the adjusting slider. The method also comprises actuating a second drive unit which is coupled to the drive cable of the adjusting slider, and therefore moving the adjusting slider relative to the main slider, such that, at least in certain portions, different movement speeds are set for the main slider and the adjusting slider, and a prescribed spacing is configured between the main slider and the adjusting slider.

The adjustment of a prescribed alignment angle of the screen arrangement in particular comprises driving a gear which realizes the drive coupling element and which is coupled to the adjusting slider and which engages with the drive cable of the main slider and with the drive cable of the adjusting slider.

BRIEF DESCRIPTIONS OF THE DRAWINGS

Exemplary embodiments of the invention are explained in more detail below with reference to the schematic drawings. In the figures.

DETAILED DESCRIPTION

Elements with identical construction or function are denoted by the same reference signs throughout the figures. For reasons of clarity, not all of the illustrated elements may be denoted by reference signs in all of the figures.

Figure 1:
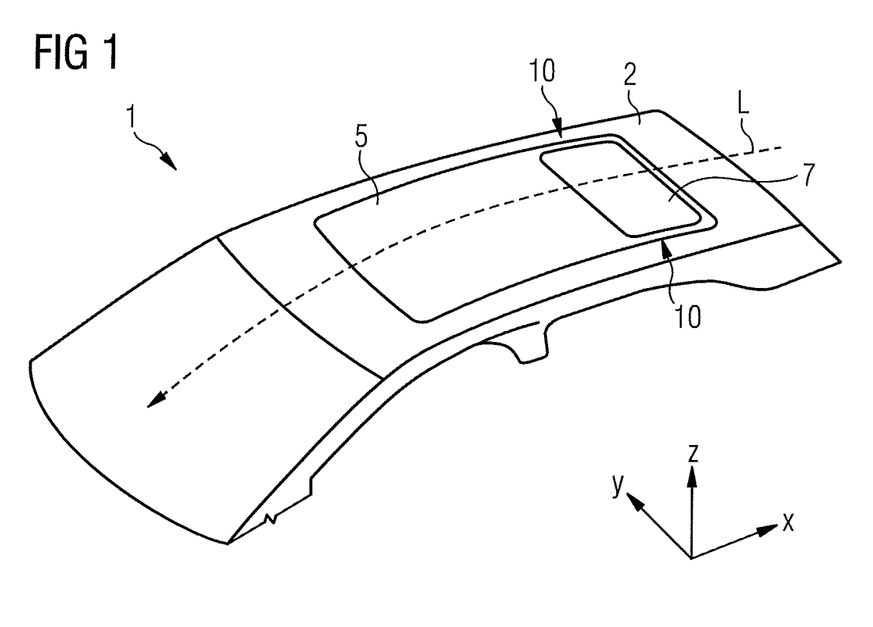
FIG. 1 shows a perspective view of a motor vehicle with a vehicle roof.
Figure 2:
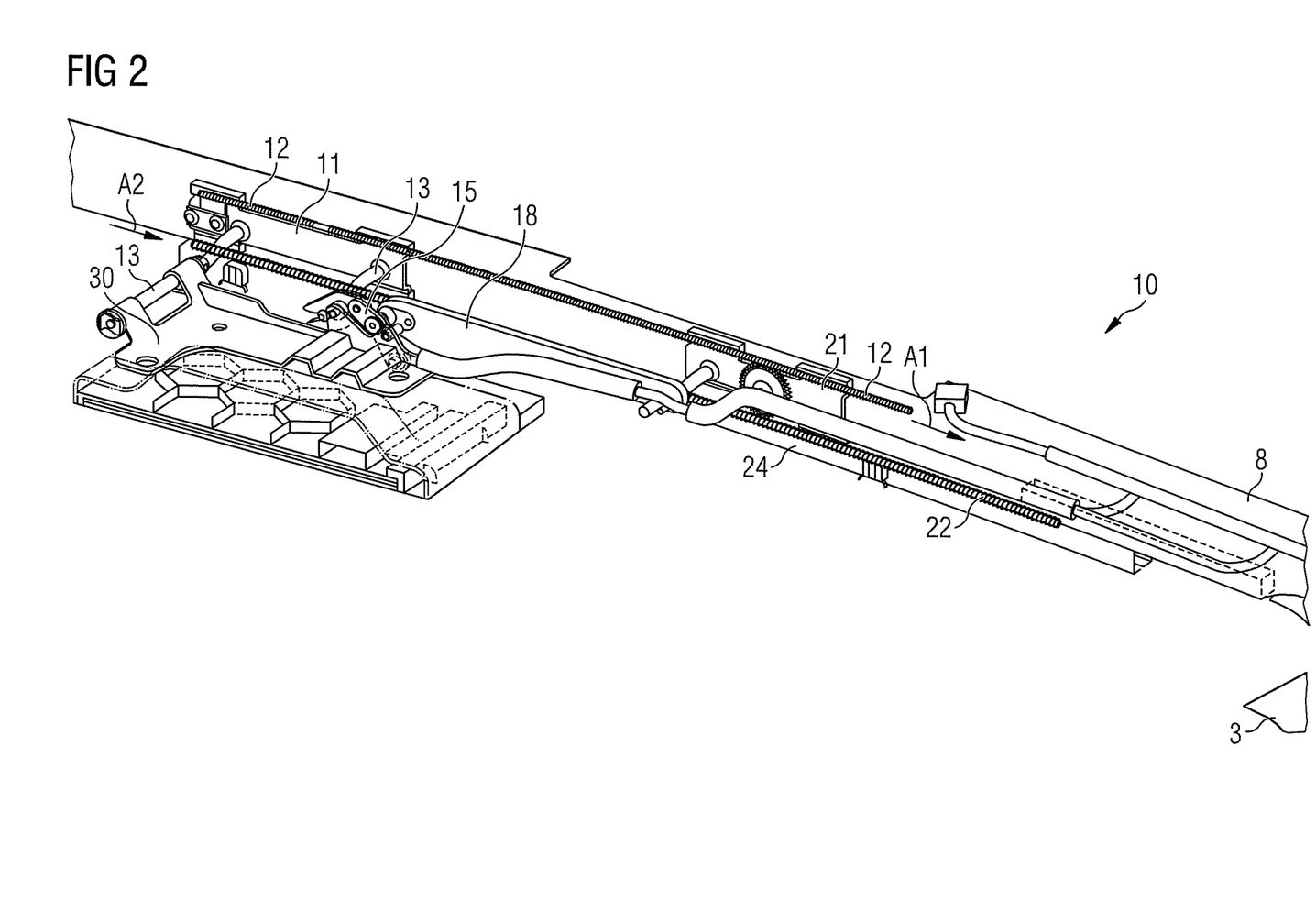
FIGS. 2-5 show an exemplary embodiment of an apparatus for adjusting a screen arrangement for a vehicle roof.

FIG. 1 schematically shows a perspective view of a motor vehicle 1 with a vehicle roof 2 which has a cover 5 and a screen arrangement 7. The cover 5 is for example a fixed glass element which cannot be moved with respect to the vehicle roof 2. As an alternative, the cover 5 is movable relative to the vehicle roof 2, in order to selectively free and close an opening in the vehicle roof 2. The vehicle roof 2 can also have no cover 5 and be an aperture-free roof skin of a foldable or collapsible convertible roof, which can be stowed in a rear region of the motor vehicle 1. In addition, the vehicle roof 2 with cover 5 can also form a convertible roof, in which the cover 5 is designed such that a folding-down or collapsing operation is made possible.

FIGS. 2 to 5 each show perspective views of an exemplary embodiment of an apparatus 10 for adjusting the screen arrangement 7 for the vehicle roof 2 according to FIG. 1. The apparatus 10 has a main slider 11 which is coupled to the screen arrangement 7 by means of a coupling pin 13 and a screen carrier 30. The main slider 11 is configured for pivoting the screen arrangement 7 out and in and for displacing the latter. The apparatus 10 also has an adjusting slider 21 which is coupled to the screen arrangement 7 by means of a supporting link 18. The adjusting slider 21 is configured for adjusting a prescribed alignment angle A of the screen arrangement 7.

The adjusting slider 21 is also coupled to a further coupling pin 13 of the main slider 11 by means of a lever arrangement 15. The lever arrangement 15 comprises two pivot levers 16 and a coupling lever 17 which is of U-shaped or pincer-shaped configuration. The pivot levers 16 and the coupling lever 17 are each coupled to one another so as to be able to pivot relative to each other and realize a kind of rotary latch having over-centre kinematics on the screen carrier 30.

In a guide rail 8, the main slider 11 is mounted so as to be drivable by means of a first drive cable 12 and the adjusting slider 21 is mounted so as to be drivable by means of a second drive cable 22. The guide rail 8 is for example fastened to a roof frame 3 of the vehicle roof 2. The depicted design should be understood, in particular, to be mirror-inverted with respect to a vehicle longitudinal axis L of the vehicle roof 2, such that a respective apparatus 10 is arranged on opposite sides of the vehicle roof 2.

The apparatus 10 also has a drive coupling element 24 which couples the drive cable 12 of the main slider 11 and the drive cable 22 of the adjusting slider 21 to one another. In the illustrated exemplary embodiment, the drive coupling element is designed as a gear 24. By means of the gear 24, the drives for the main slider 11 and the adjusting slider 21 are coupled in such a way that the main slider 11 and the adjusting slider 21 can be displaced, with respect to a common reference point, at least in certain portions, at different movement speeds, and in such a way that a spacing D1, D2, D3 between the main slider 11 and the adjusting slider 21 and therefore an alignment angle A of the screen arrangement 7 can be adjusted in a prescribed manner by means of the adjusting slider 21, independently of a position, set by means of the main slider 11, of the screen arrangement 7 in relation to a longitudinal axis of the apparatus 10.

The gear 24 is coupled to the adjusting slider 21 and engages with the drive cable 12 of the main slider 11 and with the drive cable 22 of the adjusting slider 21. As an alternative, the gear 24 can be arranged on the main slider 11 and can engage with the drive cable 12 of the main slider 11 and with the drive cable 22 of the adjusting slider 21. The gear 24 is configured such that the adjusting slider 21 is moved at half the speed of the drive cables 12, 22. The first drive cable 12 is coupled to the main slider 11 and, on an upper side, to the gear 24 and is associated with a drive A1 of the main slider 11. The second drive cable 22 is coupled, on an underside, to the gear 24 and is associated with a drive A2 of the adjusting slider 21, such that a desired spacing D1, D2, D3 between the main slider 11 and the adjusting slider 21 can be adjusted.

Figure 3:
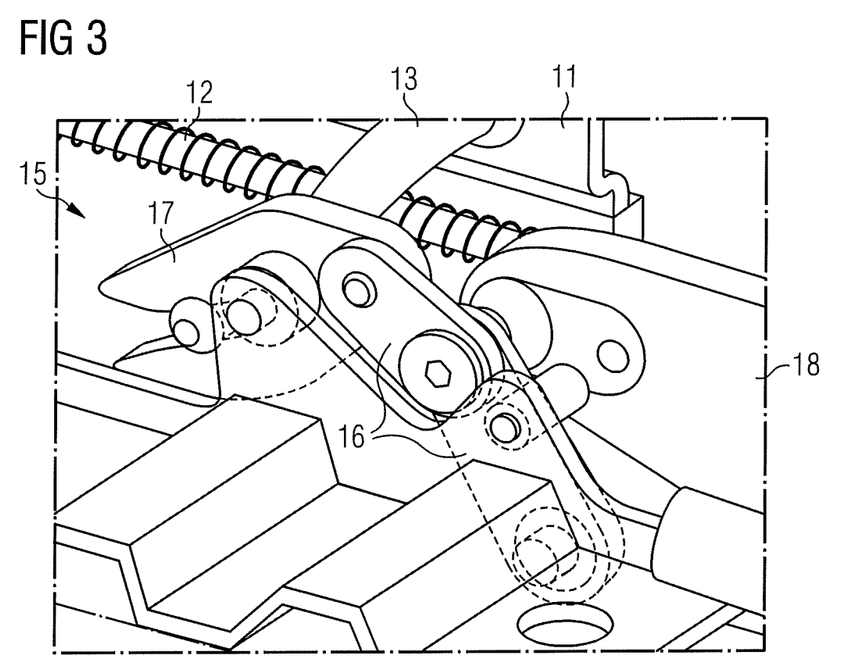

FIG. 3 shows an enlarged view of the rotary latch which is realized by way of the lever arrangement 15. One of the pivot levers 16 is coupled to the supporting link 18 and to the further pivot lever 16, in each case in a pivotable manner. The further pivot lever 16 is in turn coupled in a pivotable manner to the coupling lever 17 which engages in a pincer-like manner around a coupling pin 13 on the main slider 11 in the folded-in state of the screen arrangement 7. During a folding-out of the screen arrangement 7, the coupling lever 17 is aligned in a prescribed manner by means of the supporting link 18 and the pivot levers 16, such that a free end of the coupling lever 17 points towards the top and the coupling lever 17 can decouple towards the bottom in a further movement of the screen arrangement 7 (see FIGS. 4 and 6 to 7). The lever arrangement 15 therefore establishes a releasable coupling between the main slider 11 and the adjusting slider 21.

In the context of this description, terms such as "top", "bottom", "front", "rear", "left", "right" and also "vertical" and "horizontal" denote directional indications, alignments or positions which relate to an operational use of the apparatus 10 in a motor vehicle 1 which is ready for operation according to FIG. 1. The illustrated longitudinal axis L also has an arrow symbol which indicates a customary direction of travel for better orientation. The described screen arrangement 7 is in particular provided for vehicle occupants on the rear seat bench which can be lowered and aligned as required in a simple and comfortable manner by means of the described apparatus 10.

Figure 4:
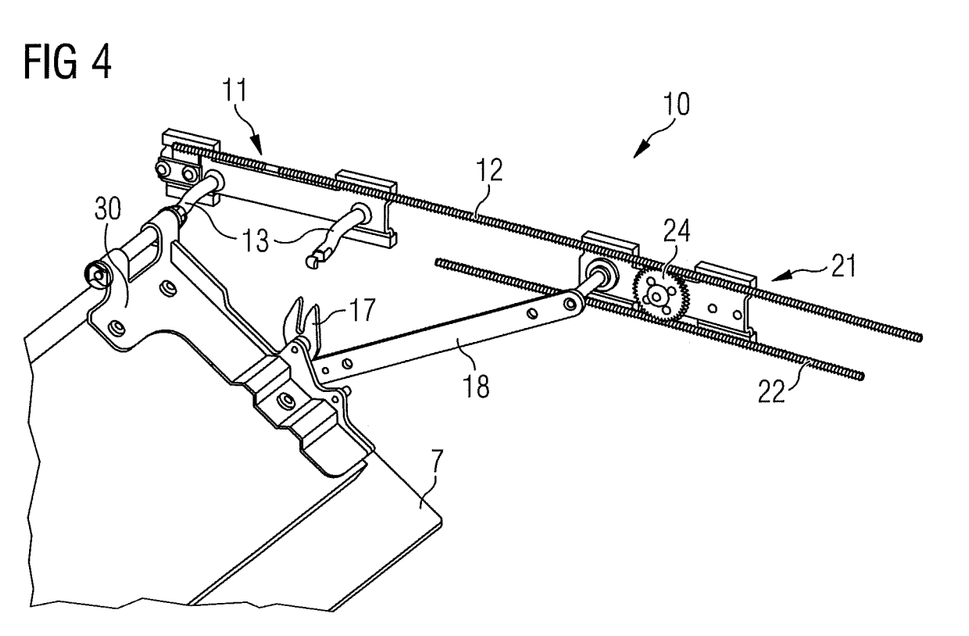

FIG. 4 shows the apparatus 10 in a further perspective view in which the guide rail 8 has been blanked out. The screen arrangement 7 is partially folded out and the coupling lever 17 is decoupled from the coupling pin 13 of the main slider 11 in that the main slider 11 has been driven by means of the drive cable 12 and moved towards the adjusting slider 21.

Figure 5:
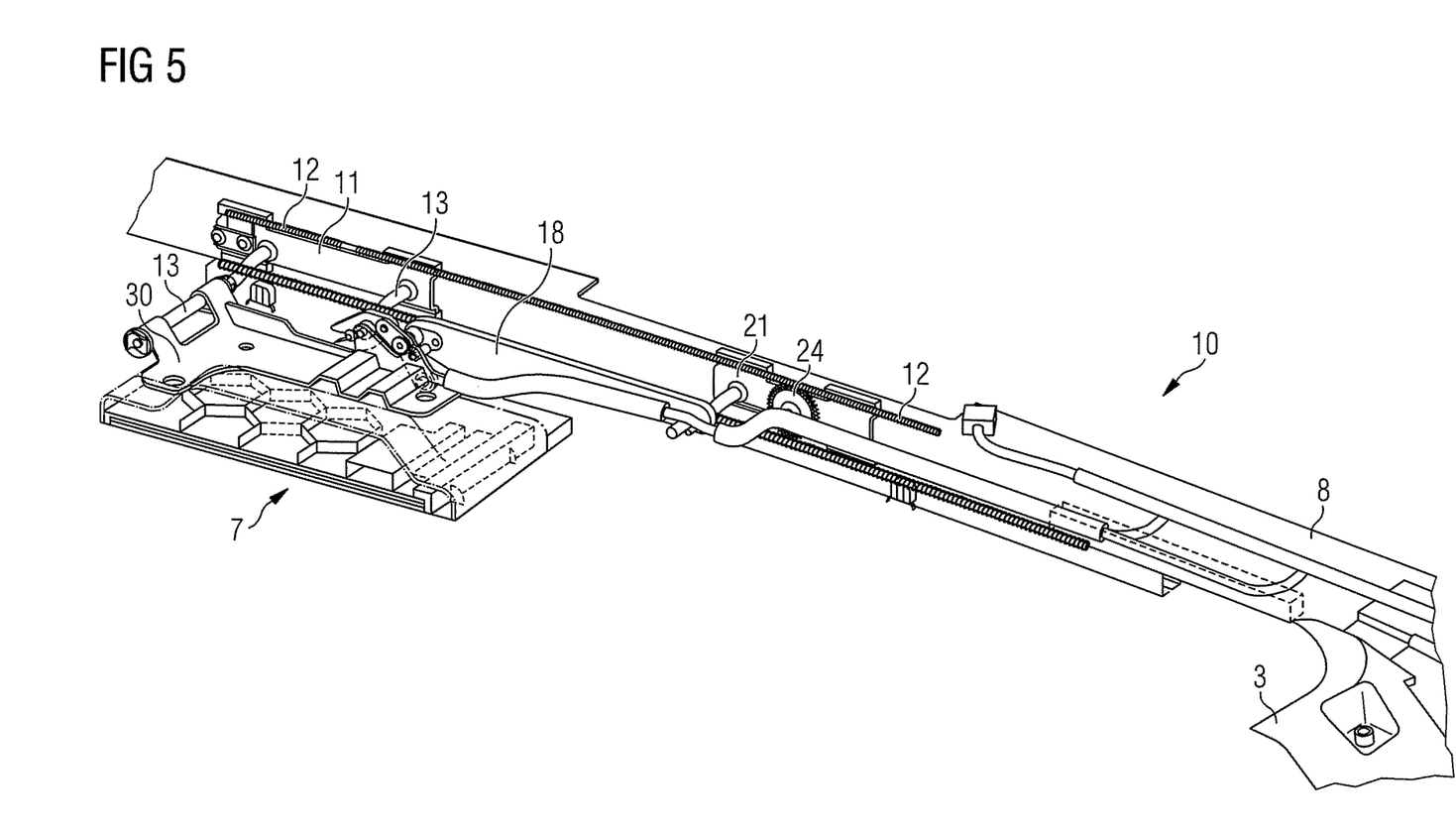

FIG. 5 shows a further perspective view of the apparatus 10 in a folded-in state of the screen arrangement 7.

FIGS. 6 to 11 show a movement sequence of the components of the apparatus 10 during folding-out, displacement and alignment of the screen arrangement 7 in various operating positions which can be adjusted in a reliable and comfortable manner by means of the apparatus 10.

Figure 6:
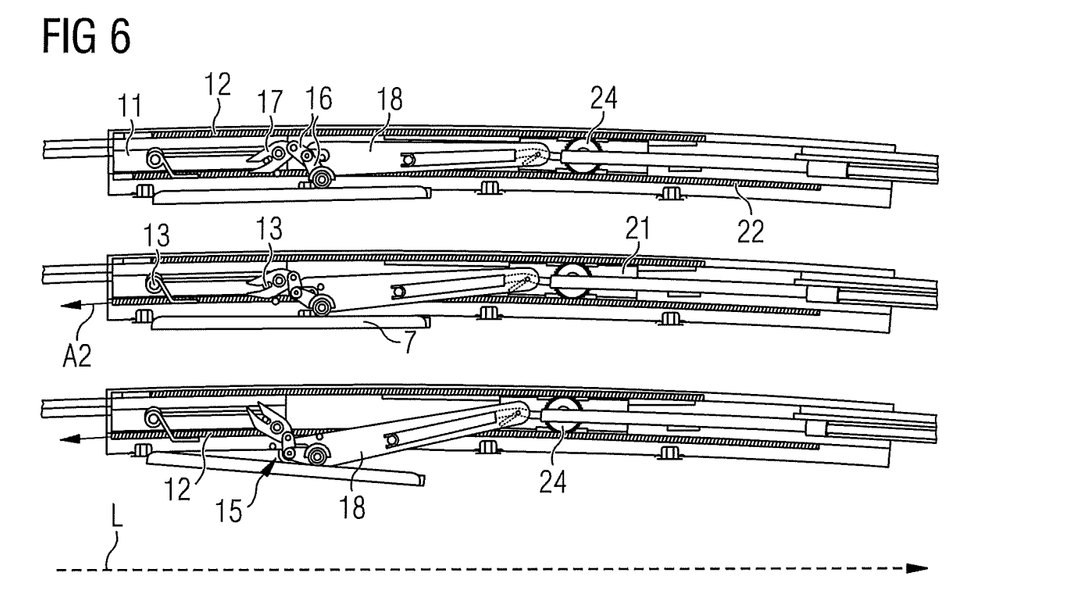
FIGS. 6-11 show various views of a movement sequence of the apparatus during the folding-out and aligning of the screen arrangement.

FIG. 6 illustrates, in the topmost image, a starting position in which the screen arrangement 7 is completely folded in and an associated display is parked or stowed substantially parallel to the vehicle roof 2. In the middle image of FIG. 6, the main slider 11 and the adjusting slider 21 have been moved towards each other in that the drive A2 has been actuated, for example. As an alternative, the adjusting slider 21 and the main slider 11 can be moved towards each other by means of the drive A1 and/or by means of the drive A2.

In the lower image of FIG. 6, the two sliders 11 and 21 have been moved even further towards each other and the screen arrangement 7 has already been slightly folded out. Here, the supporting link 18 and the rotary latch which is realized by way of the lever arrangement 15 have been aligned, such that the clip-shaped or pincer-shaped coupling lever 17 points towards the top with its free end.

Figure 7:
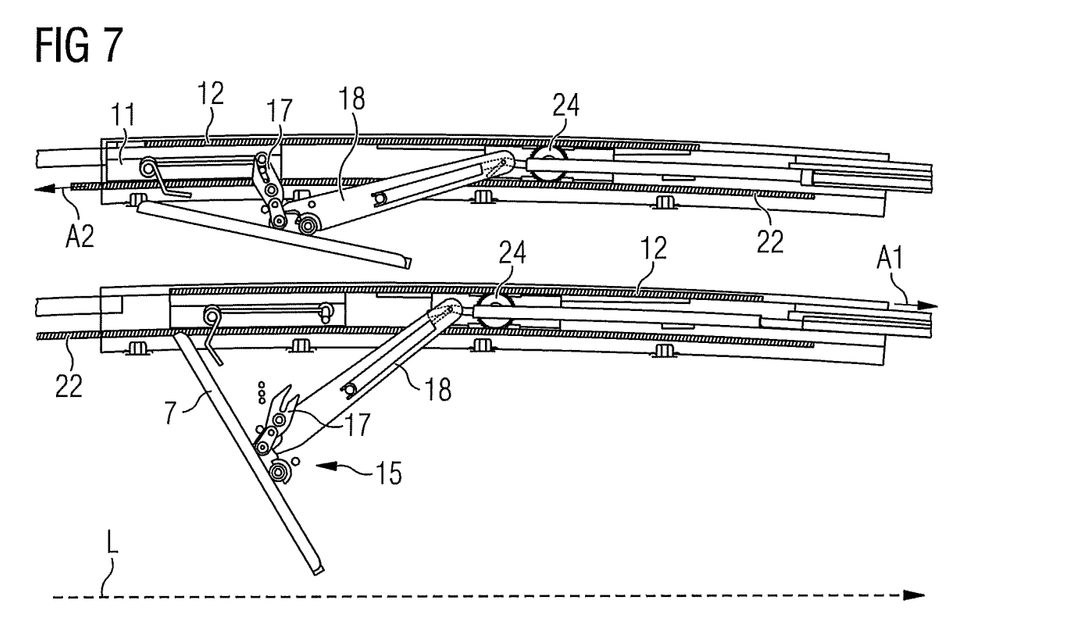

FIG. 7 shows, in two images, positions of the apparatus 10 in which the two sliders 11 and 21 have been moved even further towards each other and the screen arrangement has been further aligned. In the lower image of FIG. 7, it can be seen that the coupling lever 17 is decoupled from the coupling pin 13 of the main slider 11.

Figure 8:
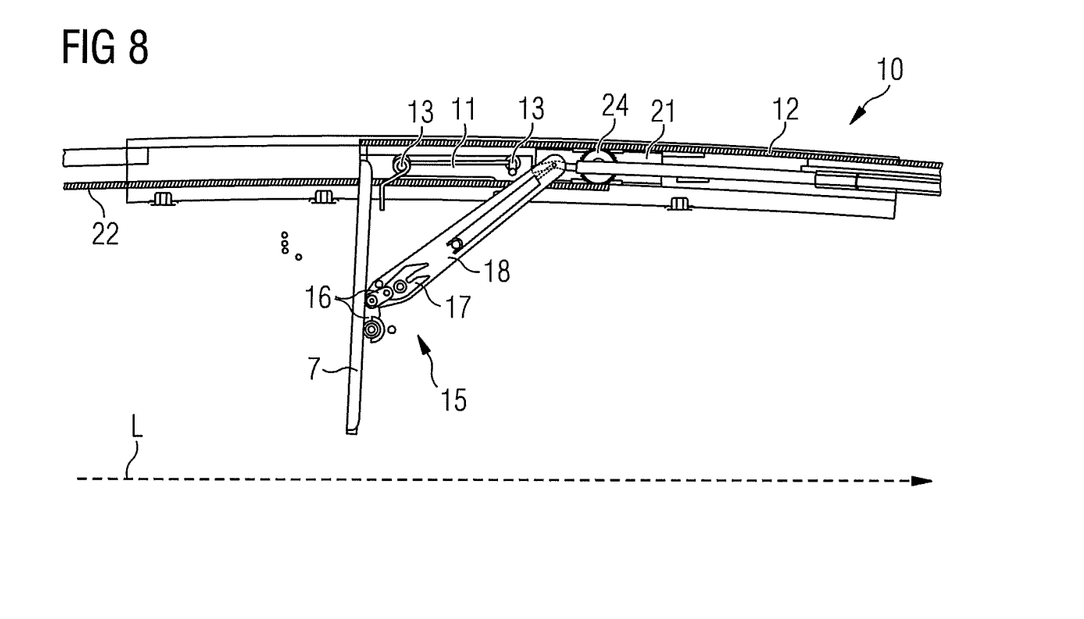

FIG. 8 shows the apparatus 10 in a completely folded-out state of the screen arrangement 7, which extends, in relation to the illustrated side view, substantially vertically in the direction of the vehicle interior. The main slider 11 and the adjusting slider 21 have a prescribed spacing D1, for example zero, and are coupled to one another or contact each other.

Figure 9:
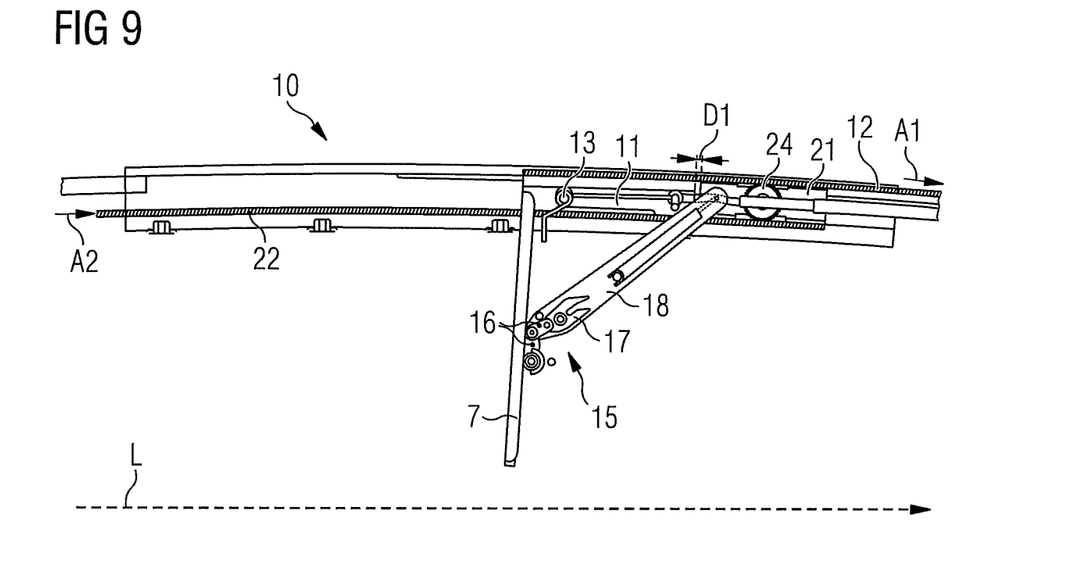

FIG. 9 illustrates a displacement of the screen arrangement 7 in the folded-out state in that, for example, the coupled-together sliders 11 and 21 are displaced further in the direction of the vehicle front by actuating the drives A1 and A2. A prescribed spacing D1 is set between the two sliders 11 and 21.

Figure 10:
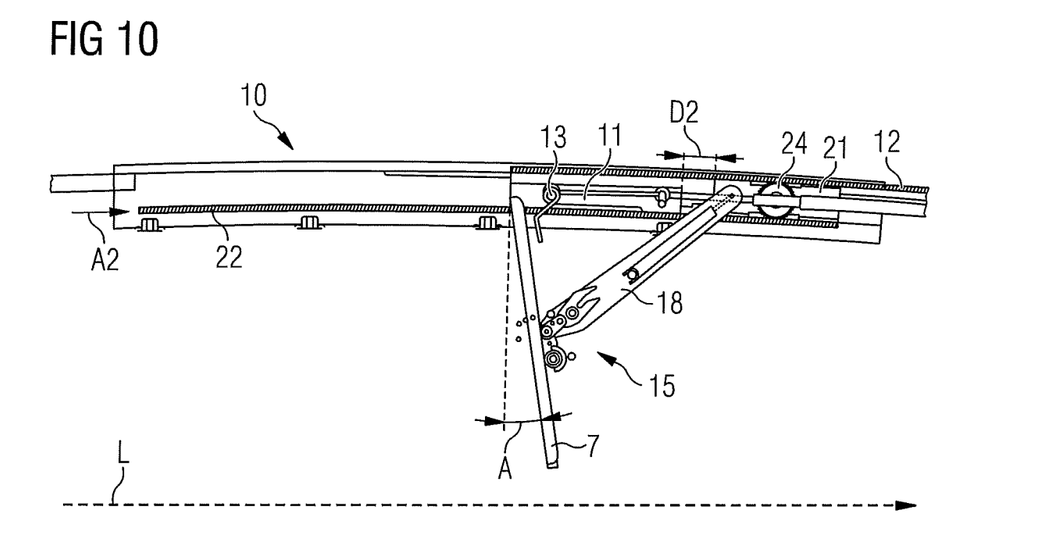

FIG. 10 illustrates the adjustment of a desired alignment angle A. By actuating the drive A2, the gear 24 is driven and the adjusting slider 21 coupled thereto moves away from the main slider 11 in the direction of the longitudinal axis L or in the direction of the vehicle front. The previously present spacing D1 is thus increased to the spacing D2.

Figure 11:
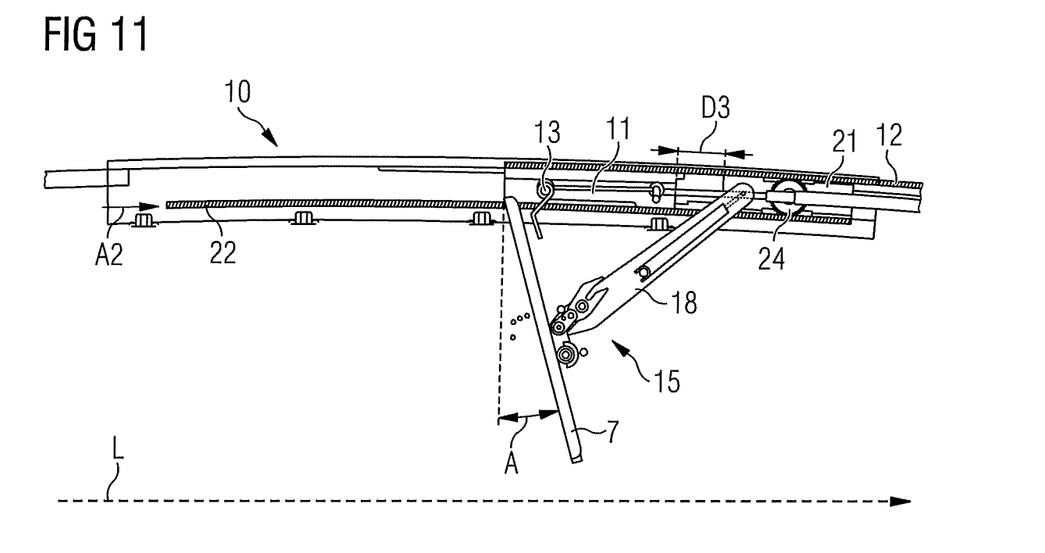

In comparison to FIG. 10, FIG. 11 illustrates the adjustment of an even greater alignment angle A. By actuating the drive A2 further, the gear 24 is driven further and the adjusting slider 21 coupled thereto moves even farther away from the main slider 11 in the direction of the vehicle front. The previously present spacing D2 is thus increased to the spacing D3.

A correspondingly inverse movement sequence can be carried out for folding in the screen arrangement 7.

LIST OF REFERENCE SIGNS

1 Motor vehicle
2 Vehicle roof
3 Roof frame
5 Cover
7 Screen arrangement
8 Guide rail
10 Apparatus
11 Main slider
12 Drive cable of the main slider
13 Coupling pin of the main slider
15 Lever arrangement
16 Pivot lever of the lever arrangement
17 Coupling lever of the lever arrangement
18 Supporting link
21 Adjusting slider
22 Drive cable of the adjusting slider
24 Drive coupling element/Gear
30 Screen carrier
A Alignment angle
A1 Drive of main slider
A2 Drive of adjusting slider
D1 Slider spacing in the folded-out state
D2, D3 Slider spacing in the folded-out and angularly displaced state
L Longitudinal axis/Direction of travel

The invention claimed is:

1. An apparatus for adjusting a screen arrangement for a vehicle roof, comprising:
   a main slider which is configured to be coupled to the screen arrangement and configured for pivoting the screen arrangement out and in and for displacing the screen arrangement, and
   an adjusting slider which is configured to be coupled to the screen arrangement and configured for adjusting a prescribed alignment angle (A) of the screen arrangement,
   wherein, in a guide rail, the main slider is mounted so as to be drivable by means of a first drive cable and the adjusting slider is mounted so as to be drivable by means of a second drive cable, and
   a drive coupling element which couples the first drive cable of the main slider and the second drive cable of the adjusting slider to one another, such that the main slider and the adjusting slider is displaceable, with respect to a common reference point, at different movement speeds, and such that with respect to a longitudinal axis (L) of the apparatus a spacing between the main slider and the adjusting slider and therefore an alignment angle (A) of the screen arrangement is adjustable in a prescribed manner by the adjusting slider, independently of a position set by the main slider.

2. The apparatus according to claim 1, wherein the drive coupling element is configured as a gear which is coupled to the adjusting slider and which engages with the first drive cable of the main slider and with the second drive cable of the adjusting slider.

3. The apparatus according to claim 1, wherein the drive coupling element is configured as a gear which is coupled to the main slider and which engages with the first drive cable of the main slider and with the second drive cable of the adjusting slider.

4. The apparatus according to claim 2, wherein the gear is configured such that a prescribed movement speed of the adjusting slider is set, said speed being, half of a drive speed of the first drive cable and the second drive cable.

5. The apparatus according to claim 1, comprising: a lever arrangement which couples the main slider and the adjusting slider to one another in a releasable manner, wherein the lever arrangement has two pivot levers and a coupling lever which are each coupled to one another so as to be able to pivot relative to each other, wherein one of the pivot levers is coupled to the adjusting slider, and the coupling lever is coupled to the main slider in a releasable manner, such that the coupling lever, in a first folded-in state of the screen arrangement, is coupled to the main slider and, in a second folded-out state of the screen arrangement, is decoupled from the main slider.

6. The apparatus according to claim 5, wherein the coupling lever of the lever arrangement is of U-shaped configuration and engages around a coupling pin on the main slider in the first folded-in state of the screen arrangement.

7. The apparatus according claim 1, comprising: a first drive unit which is coupled to the first drive cable, and a second drive unit which is coupled to the second drive cable, wherein the first and/or the second drive unit have/has an electric motor.

8. A vehicle roof for a motor vehicle, comprising: guide rails which are arranged, in relation to a longitudinal axis (L) of the vehicle roof, on opposite sides of the vehicle roof, and an apparatus for adjusting a screen arrangement according to claim 1, said apparatus being coupled to the vehicle roof the guide rails.

9. A method for adjusting a screen arrangement for a vehicle roof, comprising:
    driving a main slider, which is coupled to the screen arrangement in a pivotable manner, by means of displacement of a first drive cable, and therefore pivoting the screen arrangement and configuring a folded-out state of the screen arrangement, and
    driving an adjusting slider, which is coupled to the screen arrangement in a pivotable manner, by displacement of a second drive cable, wherein the first drive cable of the main slider and the second drive cable of the adjusting slider are coupled to one another by a drive coupling element, such that the main slider and the adjusting slider can be displaced, with respect to a common reference point, at different movement speeds, and therefore adjustment of a prescribed spacing between the main slider and the adjusting slider in relation to a longitudinal axis (L) of the vehicle roof and therefore adjustment of a prescribed alignment angle (A) of the screen arrangement is effected, independently of the configured folded-out state of the screen arrangement.

10. The method according to claim 9, wherein the driving of the main slider and the driving of the adjusting slider comprises: actuating a first drive unit which is coupled to the first drive cable of the main slider, and therefore moving at least one of the main slider and the adjusting slider, and actuating a second drive unit which is coupled to the second drive cable of the adjusting slider, and therefore moving the adjusting slider relative to the main slider, such that, different movement speeds are set for the main slider and the adjusting slider.

11. The method according to claim 9, wherein the adjustment of a prescribed alignment angle (A) of the screen arrangement comprises: driving a gear which is coupled to the adjusting slider or the main slider and which engages with the first drive cable of the main slider and with the second drive cable of the adjusting slider.

* * * * *